(12) United States Patent
Bourgeois et al.

(10) Patent No.: US 11,659,960 B2
(45) Date of Patent: May 30, 2023

(54) GRILLING RACK

(71) Applicant: METAL FUSION, INC., Jefferson, LA (US)

(72) Inventors: Norman Bourgeois, Jefferson, LA (US); Barbara Bourgeois, Jefferson, LA (US); Michael Bourgeois, Kenner, LA (US)

(73) Assignee: Metal Fusion, Inc., Jefferson, LA (US)

( * ) Notice: Subject to any disclaimer, the term of this patent is extended or adjusted under 35 U.S.C. 154(b) by 162 days.

(21) Appl. No.: 17/235,158

(22) Filed: Apr. 20, 2021

(65) Prior Publication Data

US 2021/0307565 A1 Oct. 7, 2021

Related U.S. Application Data

(63) Continuation of application No. 16/030,999, filed on Jul. 10, 2018, now abandoned, which is a
(Continued)

(51) Int. Cl.
*A47J 43/18* (2006.01)
*A23P 20/20* (2016.01)
(Continued)

(52) U.S. Cl.
CPC .............. *A47J 43/18* (2013.01); *A23L 19/05* (2016.08); *A23L 21/25* (2016.08); *A23P 20/20* (2016.08); *A23P 20/25* (2016.08); *A47J 37/07* (2013.01)

(58) Field of Classification Search
CPC .......... A23L 19/05; A23L 21/25; A23P 20/20; A23P 20/25; A47J 37/07; A47J 43/18
(Continued)

(56) References Cited

U.S. PATENT DOCUMENTS 5,983,786 A * 11/1999 Brown ................ A47J 37/0786
99/426
6,260,478 B1 * 7/2001 Harneit ................ A47J 37/067
99/446

(Continued)

*Primary Examiner* — Dana Ross
*Assistant Examiner* — Joseph W Iskra
(74) *Attorney, Agent, or Firm* — Roy Kiesel Ford Doody & North, APLC; Brett A. North

(57) ABSTRACT

A food grilling rack provides a frame defined by a plurality of connected side walls forming a closed geometric shape. The frame includes a lower corrugated sheet that provides multiple troughs, each trough having a lowest portion. The lower sheet is attached to at least some of the side walls. An upper sheet of material is supported (e.g., removably) above the sheet of corrugated material. There are a plurality of openings in the upper sheet of material, each opening being vertically aligned with a lowest portion of a trough. In one embodiment, the frame includes a pair of flanged members attached to a lower corrugated sheet that provides multiple troughs, each trough having a lowest portion. A sheet with openings slides into the frame aligning the openings with the lowest part of the trough. A food stuffing apparatus provides a receptacle having an interior, an upper end portion with a larger opening and a lower end portion with a smaller opening, and a tapering portion in between the upper and lower end portions. A plunger is provided having a head, a lower end portion with a shaft having a lower pushing surface and a joint that joins the head to the shaft. The pushing surface has a larger diameter portion, the shaft tapering above the pushing surface to a smaller diameter portion above the pushing surface in the upper one half of the plunger.

19 Claims, 7 Drawing Sheets

Related U.S. Application Data continuation of application No. 15/332,386, filed on Oct. 24, 2016, now Pat. No. 10,016,094, which is a continuation of application No. 13/363,057, filed on Jan. 31, 2012, now Pat. No. 9,474,294, which is a continuation-in-part of application No. 13/151,800, filed on Jun. 2, 2011, now Pat. No. 8,919,244.

(60) Provisional application No. 61/438,077, filed on Jan. 31, 2011, provisional application No. 61/350,826, filed on Jun. 2, 2010.

(51) Int. Cl.
*A23P 20/25* (2016.01)
*A23L 19/00* (2016.01)
*A23L 21/25* (2016.01)
*A47J 37/07* (2006.01)

(58) Field of Classification Search
USPC .......................................................... 99/441
See application file for complete search history.

(56) References Cited

U.S. PATENT DOCUMENTS

| | | | |
|---|---|---|---|
| 7,415,922 B2 * | 8/2008 | Cheng .................. | A47J 37/067 99/425 |
| 2007/0125357 A1 * | 6/2007 | Johnston ............. | A47J 37/0713 126/41 R |
| 2008/0066734 A1 * | 3/2008 | Bright ................. | A47J 37/0694 126/25 R |

* cited by examiner

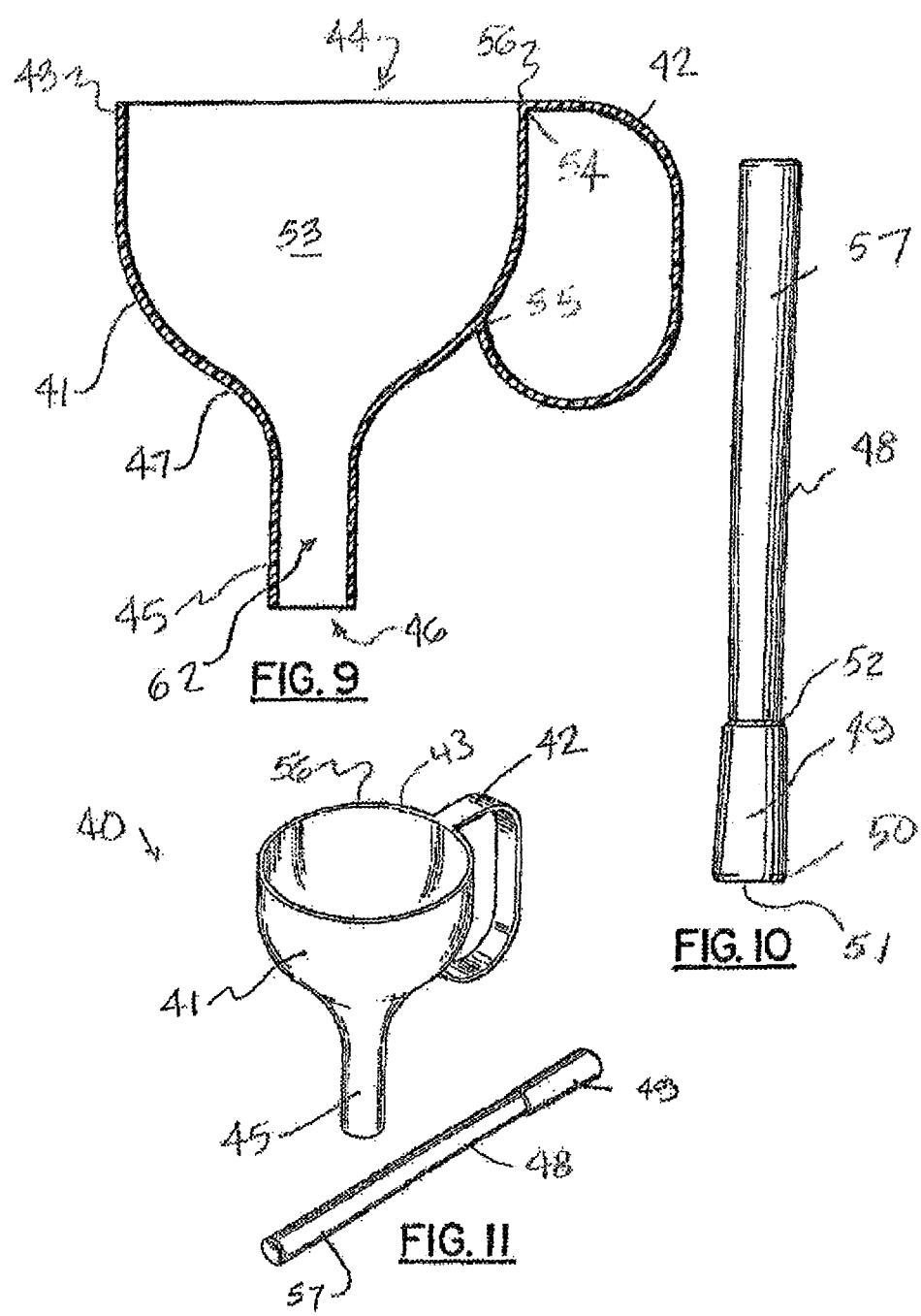

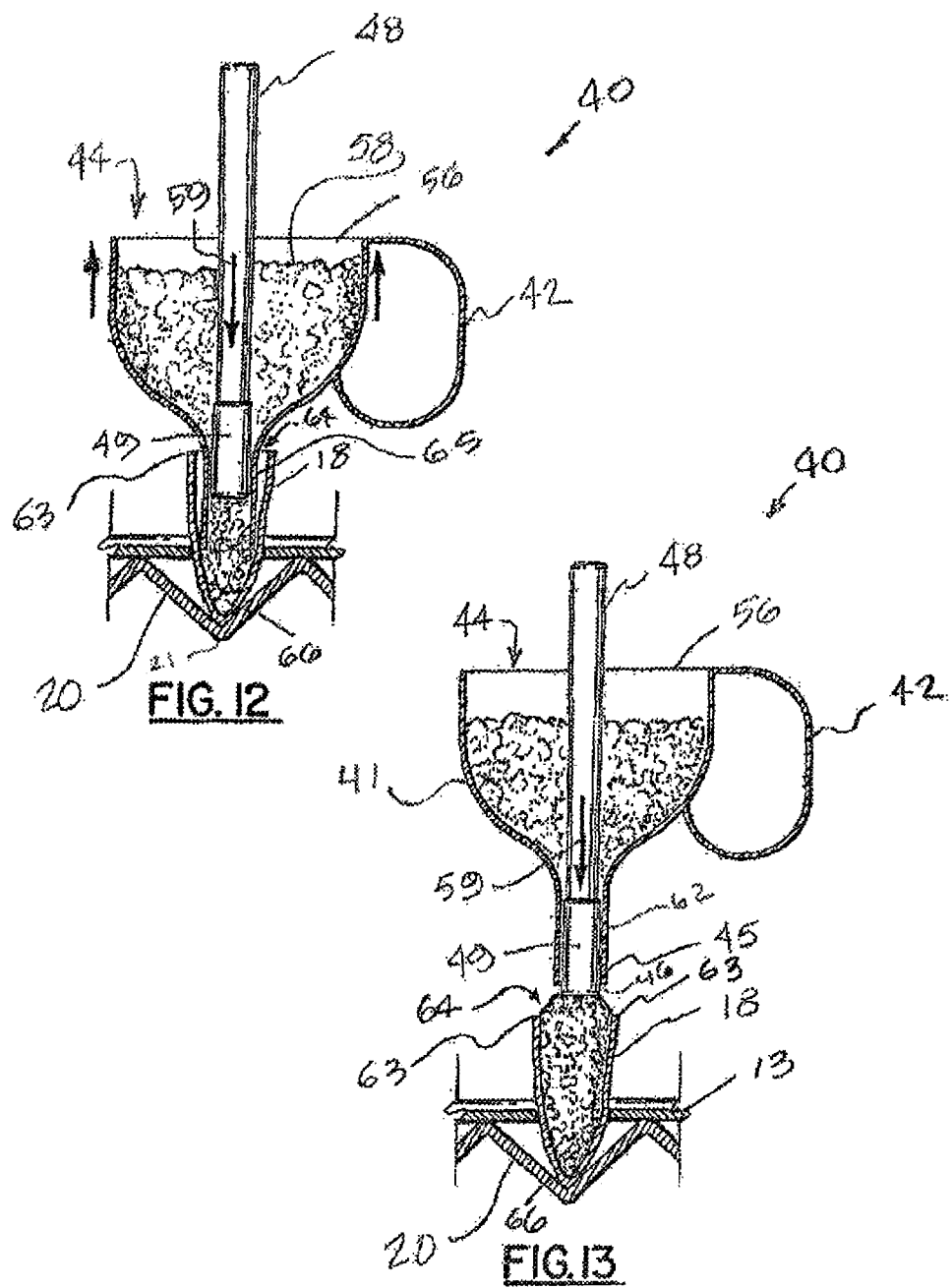

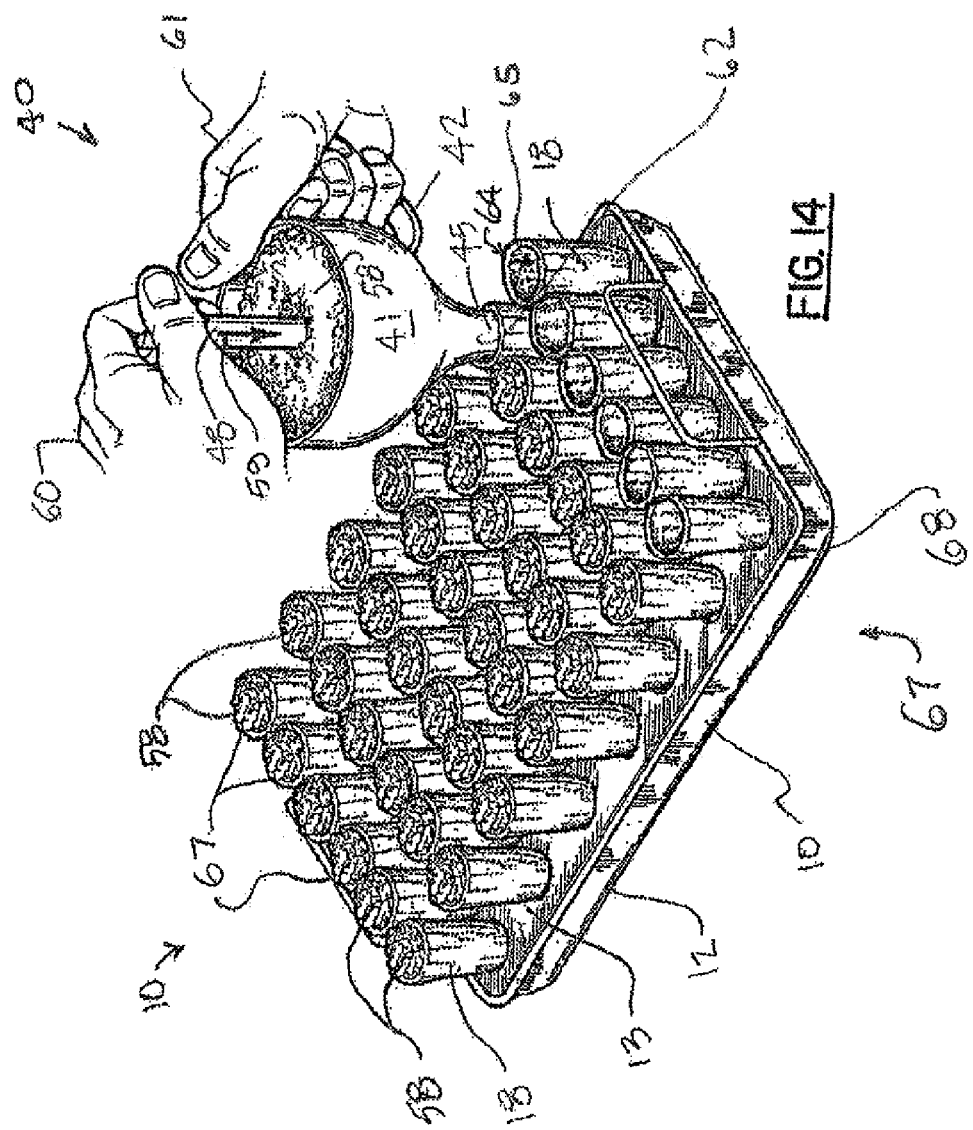

GRILLING RACK

CROSS-REFERENCE TO RELATED APPLICATIONS

This is a continuation of U.S. patent application Ser. No. 16/030,999, filed Jul. 10, 2018, which is a continuation of U.S. patent application Ser. No. 15/332,386, filed Oct. 24, 2016 (now U.S. Pat. No. 10,016,094 on Jul. 10, 2018), which is a continuation of U.S. patent application Ser. No. 13/363,057, filed Jan. 31, 2012 (now U.S. Pat. No. 9,474,294 on Oct. 25, 2016), which is a continuation-in-part of U.S. patent application Ser. No. 13/151,800, filed Jun. 2, 2011 (now U.S. Pat. No. 8,919,244 on Dec. 23, 2014), which is a nonprovisional of both U.S. Provisional Patent Application Ser. No. 61/350,826, filed Jun. 2, 2010, and U.S. Provisional Patent Application Ser. No. 61/438,077, filed Jan. 31, 2011, all of which applications are hereby incorporated herein by reference and priority of/to all of which applications are hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to food grilling racks that can be used to contain food and then be placed upon a cooking surface such as an outdoor grilling surface. The present invention also relates to a method and apparatus for stuffing a selected food stuffing into a food item such as a pepper or other vegetable food item. More particularly, the present invention relates to an apparatus that holds a volume of food stuffing material (e.g., a rice based stuffing, cheese based stuffing or a mixture of meat and cheese and possibly other food items).

2. General Background of the Invention

Food items are often placed upon a perforated plate, which is then placed upon a barbecue pit, outdoor grill or other outdoor cooking surface. Such perforated plates are commercially available. At times, they are provided with handles for enabling a user to lift and move the plate before and after use. It is common and known to grill a number of different food items on such perforated grilling plates, such as onions, peppers, corn, and other food items.

Some food items such as jalapeno peppers or bell peppers can be stuffed with food items such as a breaded mixture of rice and meat or seafood. In such a case, users often cut the pepper transversely or longitudinally and fill each of the cut halves with a selected stuffing or filling.

One of the problems with the prior art grilling racks is that the food items can often fall in between the openings or become stuck in the openings.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a partial sectional view of the preferred embodiment of the present invention showing the food dispensing funnel;

FIG. 10 is a perspective view of the preferred embodiment of the present invention showing the food dispensing plunger or push rod;

FIG. 11 is a perspective view of the preferred embodiment of the present invention showing the food dispensing plunger and push rod;

FIGS. 12-13 are sectional views illustrating the method of the present invention; and FIG. 14 is a perspective view illustrating the method of the present invention.

DETAILED DESCRIPTION OF THE INVENTION

Figure 1:
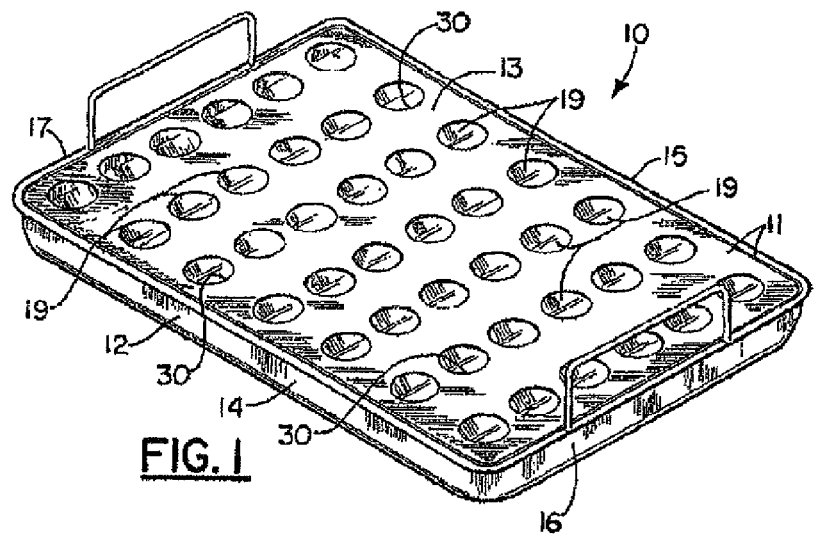
FIG. 1 is a perspective view of a preferred embodiment of the present invention.

FIGS. 1-4 show a preferred embodiment of the apparatus of the present invention designated generally by the numeral 10. Grilling rack 10 is in the form of a two part frame 11 which can be metallic (e.g., aluminum or stainless steel). Frame 11 has a lower section 12 and an upper section 13. Upper section 13 is a removable plate that can be perforated or apertured.

The upper section or plate 13 can be in the form of a perforated plate that can be removed from the lower section 12 by lifting the upper section 13 upwardly. Lower section 12 has a corrugated bottom panel 20 (see FIGS. 2-4) that has troughs 21 and peaks 22 (See FIGS. 2-3). Bottom panel 20 can be of a mesh material (e.g., stainless steel mesh) or of solid plate metal (e.g., stainless steel). Lower section 12 can be generally rectangular, providing side walls 14, 15 and end walls 16, 17. Each end wall 16, 17 can be provided with a handle. End wall 16 has a handle 23. End wall 17 has a handle 24. Each trough 21 and peak 22 is connected with an inclined panel 25. (See FIG. 4.) While multiple troughs 21 are shown, a single trough 21 could be provided on an elongated lower section 12 having a single row of openings 19 in an upper section 13 (as an alternate embodiment).

Figure 2:
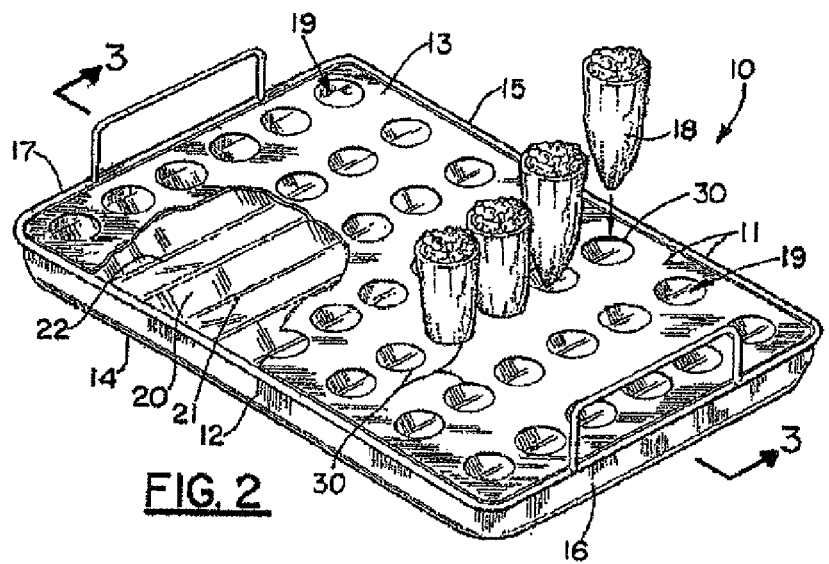
FIG. 2 is a partially cut away perspective view of a preferred embodiment of the present invention.
Figure 3:
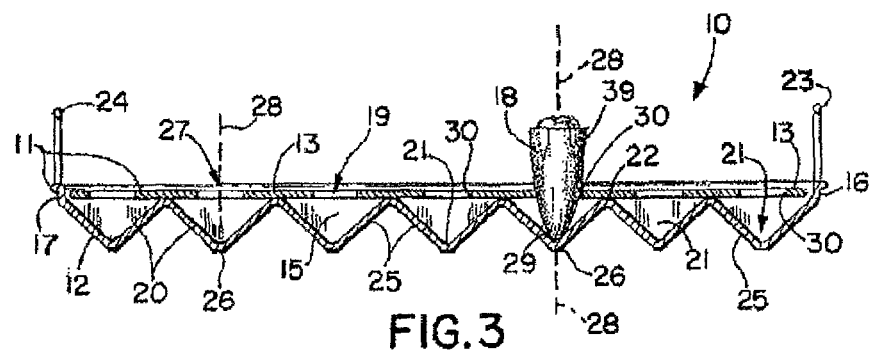
FIG. 3 is a sectional view taken along lines 3-3 of FIG. 2.
Figure 4:
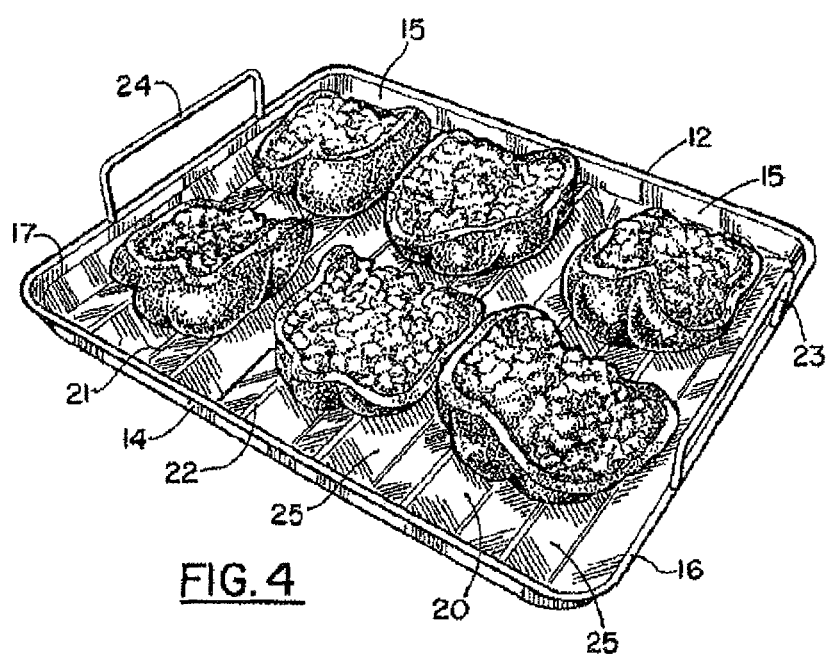
FIG. 4 is a perspective view of a preferred embodiment of the present invention showing the upper plate removed.

The upper section or plate 13 nests within the side walls 14, 15 and end walls 16, 17 and rests upon the plurality of peaks 22 of corrugated bottom panel 20 (see FIGS. 1-3). The lower section 12 can be of welded metal construction including troughs 21 which can be formed of sections of angle members, flanged members or the like that are welded together. Alternatively, a single sheet of material can be corrugated to the shape of lower section 12 using a stamp or die.

Each trough 21 has a trough 21 lower end 26 that is centered upon the center 27 of an opening 19 as seen by referring to reference line 28 in FIG. 3. In this fashion, when an elongated food item (such as an elongated pepper 18) is placed in an opening 19, the lower end of the pepper 18 also registers in the V-shaped trough 21 and more particularly in the lower most portion 26 thereof (see FIG. 3).

When grilling stuffed elongated peppers (e.g., a jalapeno), the upper section or plate 13 is placed upon the lower section 12 (see FIGS. 1-3). Notice in FIG. 3 that the center 27 of each opening 19 is vertically aligned with the lowest end 26 of a trough 21 as indicated by the dotted reference line 28 in FIG. 3. Lower end 29 of pepper 18 rests in lower end 26 of trough 21. Circular edge 30 that defines each opening 19 engages and supports pepper 18 in between its upper end 39 and lower end 29 as seen in FIGS. 2-3. Upper section or plate 13 is shown having an array of openings 19. In FIGS. 1-2, there are seven rows of openings 19, six openings 19 in each row. However, more or fewer rows can be provided. Each row can provide any selected number of openings 19.

Figure 5:
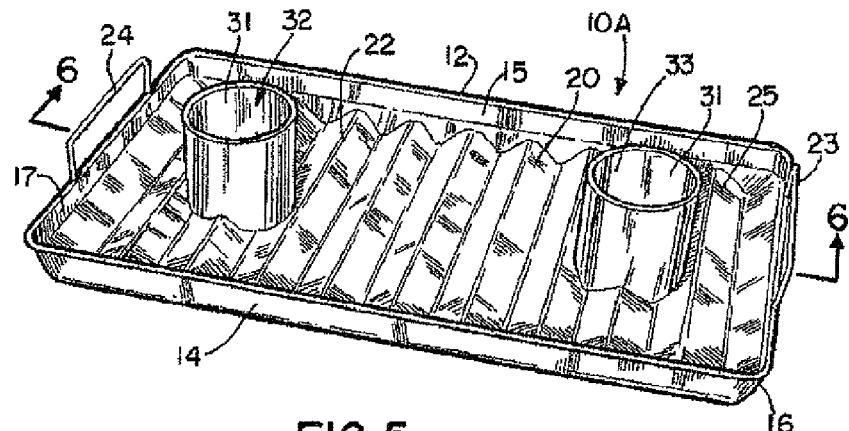
FIG. 5 is a perspective view of an alternate embodiment of the apparatus of the present invention.
Figure 6:
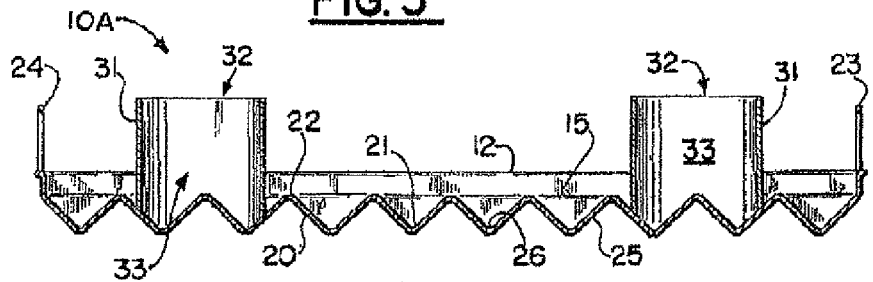
FIG. 6 is a sectional view of an alternate embodiment of the apparatus of the present invention taken along lines 6-6 of FIG. 5.
Figure 7:
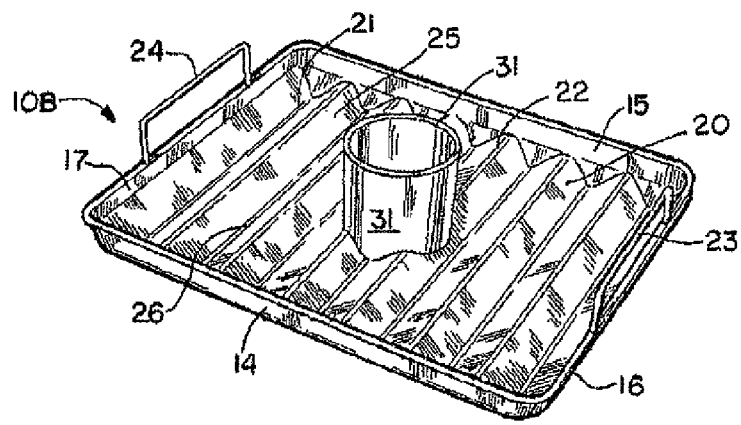
FIG. 7 is a perspective view of an alternate embodiment of the apparatus of the present invention.
Figure 8:
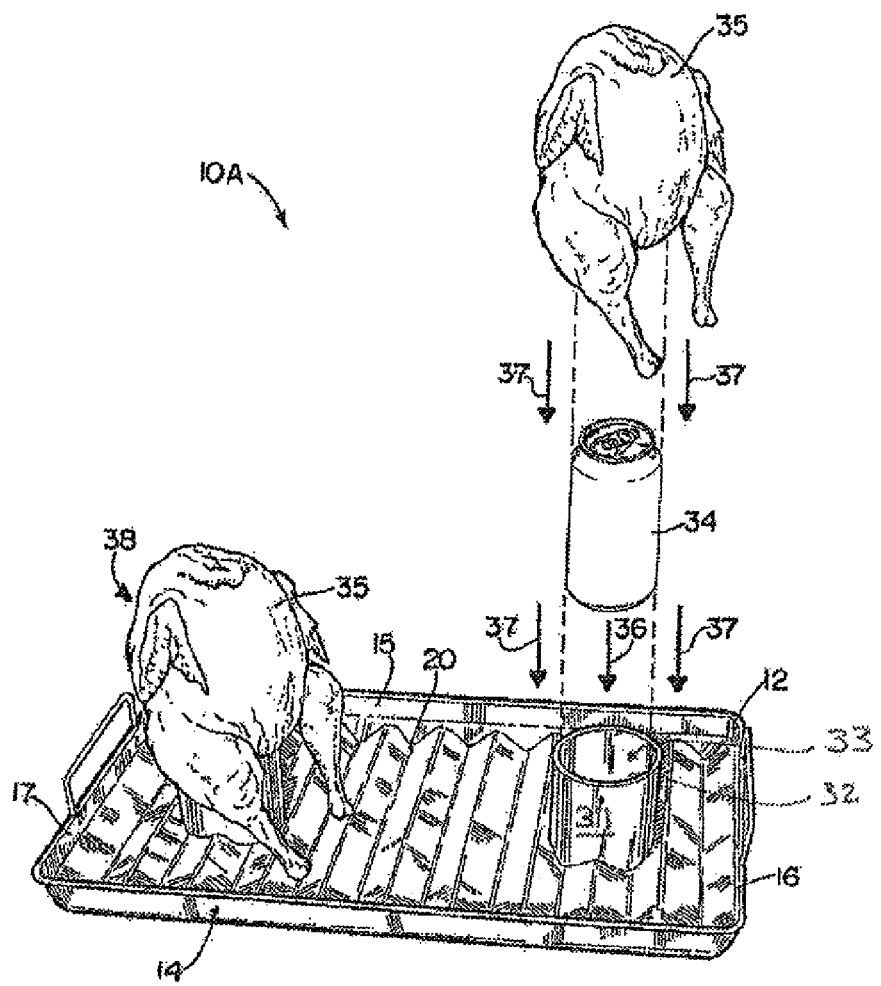
FIG. 8 is an exploded perspective view of an alternate embodiment of the apparatus of the present invention.

In FIGS. 5-8, an alternate version of the grilling rack is designated by the numeral 10A in FIGS. 5-6 and 8 and numeral 10B in FIG. 7. For the racks 10A-10B, there is no upper section or plate 13.

In FIGS. 5, 6, and 8, the rack 10A includes a pair of cylinders or cylindrically shaped members or receptacles 31. Each cylinder 31 has an open top 32 and an interior 33 for holding a vegetable or other food item or a container of seasoning such as an opened can 34 of any selected beverage. Rack 10B in FIG. 7 provides only cylinder 31. Each receptacle 31 is attached to corrugated bottom panel 20. Receptacle 31 can be placed anywhere on the rack 10A. Panel 20 can be a single sheet of corrugated material or a plurality of tapered or V-shaped members welded together. Corrugated panel 20 can have handles 23, 24 connected thereto (e.g., welded).

The present invention provides an improved grilling rack apparatus that enables a user to cook many food items including elongated peppers that have been stuffed with a filler or filling. For the embodiment of FIGS. 4-8, food item 35 such as poultry can be supported upon (e.g. skewered) a cylinder 31 that contains flavoring (e.g. opened can 34 of any selected liquid or spices or vegetables). Arrow 36 in FIG. 8 illustrates placement of can 34 within interior 33 of cylinder 31 via open top 32. A food item 35 such as a chicken can be placed over (e.g., skewered) the combination of opened can 34 and cylinder 31 as indicated by arrows 37 in FIG. 8. Such final position of the food item (e.g., poultry carcass, chicken, etc.) is designated as 38 in FIG. 8 wherein the can 34 (or other spice or flavoring) occupies interior 33 of cylinder/receptacle 31 and the food item 35 is skewered over both cylinder 31 and the contained can 34 or spice or flavoring. Receptacle 31 can be placed anywhere on the rack 10B.

FIGS. 9-11 show the food dispensing funnel, plunger, push rod. FIGS. 12-14 show the method of the present invention. In FIG. 11 there is a food stuffing apparatus, designated generally by the numeral 40. Food stuffing apparatus 40 includes a receptacle or funnel 41 that can contain a volume of a selected food stuffing 58 (e.g., rice or cheese or meat based stuffing or dressing). Receptacle 41 can be of metallic (e.g., stainless steel) or plastic (e.g., any food grade plastic) construction. This food stuffing or dressing 58 can be added to interior 53 of receptacle 41 via an open top 44 at upper end portion 43. The receptacle 41 has upper end portion 43 and lower end portion 45. Tapered portion 47 joins upper end portion 43 to lower end portion 45. (See FIGS. 9, 11.)

Upper end portion 43 can include a circular rim or edge 56. A dispensing outlet opening 46 is provided at lower end portion 45. Receptacle 41 can be manually supported and manipulated using handle 42 which is attached to the outer surface of receptacle 41 at attachments 54, 55. (See FIGS. 9, 11.)

Plunger 48 has head 49 with lower end portion 50. Head 49 has a circular, generally flat end surface 51. Plunger 48 has a handle 57 attached at joint 52 to plunger head 49. Head 49 can be generally cylindrically shaped or can have a taper as shown in FIG. 10. Outlet opening 46 has a circular configuration that closely matches the size and shape of end surface 51 of plunger 48. Outlet opening 46 can be of the same diameter or slightly larger in diameter than plunger 48 surface 51. Head 49 is preferably of a food grade plastic or metal material. Handle 57 can be of wood, plastic or metal.

FIGS. 12-14 illustrate more particularly the method of the present invention. In FIGS. 12-14, there can be seen an array 67 of peppers 18 placed in grilling rack 10. As shown in the FIGS. 1-8 and as discussed in the preceding, corresponding text, the grilling rack 10 has a lower section 12, upper section 13, a plurality of openings 19 and a corrugated bottom panel 20. Each pepper 18 is first cut using a knife to form a transverse cut 63 and a pepper opening 64 through which food stuffing can enter the pepper cavity 65. The cavity 65 extends between pepper opening 64 and lower end 66 as shown in FIGS. 12 and 13.

After each pepper 18 is cut to provide the pepper opening 64 and to expose cavity 65, the pepper 18 is placed on rack 10 with opening 64 facing up as shown in FIG. 14. Once each of the openings 19 of rack 10 is fitted with a pepper 18 as shown in FIG. 14, a user fills each pepper 18 cavity 65 with food stuffing 58 of the user's choice. During the filling of each pepper 18 cavity 65 with food stuffing 58, a user positions one hand 61 to hold the handle 42 of receptacle or funnel 41. The user grasps plunger 48 with the other hand 60 as shown in FIG. 14. An up and down movement of the plunger 48 relative to the receptacle 41 forces the stuffing 58 through the cylindrically shaped channel 62 at lower end portion 45 of receptacle 41.

FIG. 12 illustrates a downward movement of plunger 48 as indicated by arrow 59 wherein stuffing 58 is pushed by plunger head 49 through lower end 45, through channel 62, and into pepper 18 cavity 65. Note in FIG. 12 that the lower end portion 45 of receptacle 41 is sized and shaped to fit inside of pepper 18 lower end of cavity 66. The external diameter of lower end portion 45 at dispensing outlet opening 46 is preferably about the same diameter or is a smaller diameter when compared to the diameter of pepper opening 64. This arrangement can be seen in FIGS. 12 and 13.

By using the method of the present invention, a user can prepare an entire array 67 of peppers upon grilling rack 10 for placement in a cooking device, oven, barbeque pit, or the like.

The method of the present invention enables an entire array 67 of peppers to be supported in a position that places the lower end portion of the pepper in trough 21 of grilling rack 10 while orienting the transversely cut pepper opening 64 upwardly. In this fashion, the opening 64 easily receives lower end portion 45 and opening 46 of receptacle 41 as shown in FIG. 12. The user raises and lowers the plunger 48 repeatedly to push food stuffing into cylindrically shaped channel 62 and then into cavity 65 until the pepper 18 cavity 65 is filled with stuffing as shown in FIGS. 12 and 13. In FIG. 14, most of the peppers 18 have been stuffed with food stuffing 58. A final row at 68 shows six peppers 18 that have not yet been filled with food stuffing 58. Once the user fills the cavity 65 of each pepper 18, the array 67 of peppers supported upon rack 10 are placed in heat transfer contact with a selected cooking device, smoker, camp fire, barbeque pit, oven or the like.

PARTS LIST

The following is a list of parts and materials suitable for use in the present invention:

| Parts Number | Description |
| --- | --- |
| 10 | grilling rack |
| 10A | grilling rack |
| 10B | grilling rack |
| 11 | frame |
| 12 | lower section |
| 13 | upper section/plate |
| 14 | side wall |
| 15 | side wall |
| 16 | end wall |
| 17 | end wall |
| 18 | pepper |
| 19 | opening |
| 20 | corrugated bottom panel |
| 21 | trough |
| 22 | peak |
| 23 | handle |
| 24 | handle |
| 25 | inclined panel |
| 26 | lower end |
| 27 | center of opening |
| 28 | reference line |
| 29 | lower end |
| 30 | circular edge |
| 31 | cylinder/recep taele |
| 32 | open top |
| 33 | interior |
| 34 | can |
| 35 | food item |
| 36 | arrow |
| 37 | arrow |
| 38 | position |
| 39 | upper end |
| 40 | food stuffer/food stuffing apparatus |
| 41 | receptacle/funnel |
| 42 | handle |
| 43 | upper end portion |
| 44 | open top |
| 45 | lower end portion |
| 46 | dispensing outlet opening |
| 47 | tapered portion |
| 48 | plunger |
| 49 | plunger head |
| 50 | lower end portion |
| 51 | flat, circular end surface |
| 52 | joint |
| 53 | interior |
| 54 | attachment |
| 55 | attachment |
| 56 | rim/edge |
| 57 | handle |
| 58 | food stuffing |
| 59 | arrow |
| 60 | user's hand |
| 61 | user's hand |
| 62 | cylindrically shaped channel |
| 63 | transverse cut |
| 64 | pepper opening |
| 65 | cavity |
| 66 | lower end of cavity |
| 67 | array of peppers |
| 68 | final row |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A food grilling rack for grilling elongated pepper food items, comprising:
   a) a frame including a plurality of side walls a lower corrugated sheet defined by alternating peaks and troughs, each trough having being defined by portions of peaks which are closest to the trough and having a lowest trough portion, the lower corrugated sheet being attached to at least one of the side walls;
   b) an upper sheet that is supported by the lower corrugated sheet;
   c) an array of openings in the upper sheet including a plurality of rows, each row having a plurality of openings, each opening having an opening perimeter, wherein when the opening perimeter is projected downwardly, the opening perimeter vertically aligns with the lowest trough portion of one of the troughs; and
   d) each row of the array of openings being located above a different one of the troughs, there being a lateral distance between pairs of peaks closest to each trough, and wherein for each row of the plurality of rows of openings, only the openings of one row of the plurality of rows of openings is located in between the pair of peaks that the particular row of openings is located above;
   e) wherein each of the plurality of openings of each row has a largest dimension, and this largest dimension is smaller than the lateral distance between the pair of peaks that the particular row of openings is located above, but sufficiently large so that an elongated pepper food item extending through one of the plurality of openings of the particular row is supported by both the opening the pepper food item extends through and the trough the particular row of openings is above and
   f) wherein the lower sheet is of a mesh material.

2. The food grilling rack of claim 1, wherein the elongated pepper food item is substantially vertical.

3. The food grilling rack of claim 1, wherein the upper and lower sheets are spaced apart with a gap therebetween.

4. The food grilling rack of claim 1, wherein the rows of openings are arranged along parallel lines.

5. The food grilling rack of claim 1, wherein the openings of the rows of openings form a matrix of parallel rows and parallel columns.

6. The food grilling rack of claim 1, wherein the lower sheet is of a solid metallic plate.

7. The food grilling rack of claim 1, wherein the corrugated sheet has crests and the upper sheet of material is supported by one or more of said crests.

8. The food grilling rack of claim 1, wherein the connected side walls of the frame form right angled corners.

9. The food grilling rack of claim 1, wherein there are at least three (3) of said troughs.

10. A food grilling rack for grilling elongated pepper food items, comprising:
    a) a frame including a plurality of sidewalls and a lower sheet that provides multiple peaks and valleys, each valley having a lowest portion and the corrugated sheet having spaced apart peaks forming valleys between the immediately adjacent spaced apart peaks, the immediately spaced apart peaks being spaced apart a first distance;
b) an upper sheet of material that is spaced above the lower sheet;
c) an array of openings in the upper sheet including a plurality of rows, each row having a plurality of openings, each opening having an opening perimeter, wherein when the opening perimeter of each of the openings in the plurality of openings is projected downwardly, the projected opening perimeter vertically aligns with the lowest portion of the valley;
d) each row having its plurality of openings being located above a single valley of the multiple valleys, wherein there being a lateral distance between each immediately adjacent spaced apart peaks forming each valley, and wherein for each particular row in the plurality of rows, only the openings of said particular row has its plurality of openings being located in between the immediately adjacent spaced apart peaks forming the valley that the particular row of openings is located above;
e) wherein each of the plurality of openings of each row has a largest dimension, and this largest dimension is smaller than the lateral distance between the immediately adjacent spaced apart peaks forming the valley that the particular row of openings is located above, but sufficiently large so that an elongated pepper food item extending through one of the plurality of openings of the particular row is supported by both the opening the pepper food item extends through and the valley the particular row of openings is above; and
f) wherein the lower sheet is of a mesh material.

11. The food grilling rack of claim 10, wherein the elongated pepper food item is substantially vertical.

12. The food grilling rack of claim 10, wherein the upper and lower sheets are spaced apart with a gap therebetween.

13. The food grilling rack of claim 10, wherein the connected side walls of the frame form right angled corners.

14. The food grilling rack of claim 10, wherein there are at least three (3) of said valleys.

15. A food grilling rack for grilling elongated food items, comprising:

a) a pan having a plurality of side walls and a pan bottom wall connected to at least one of the walls of the plurality of sidewalls;
b) the pan bottom wall being a lower corrugated sheet defined by alternating peaks and troughs, each trough having a lowest portion;
c) an upper sheet of material that is supported by the lower corrugated sheet;
d) an array of openings in the upper sheet including a plurality of rows, each row having a plurality of openings, each opening having an opening perimeter and wherein the opening perimeter aligns with the bottom of the trough, wherein each said opening of the plurality of openings aligns with the lowest portion of the bottom of the trough; and
e) each row of the plurality of rows of openings being located above a trough, there being a lateral distance between each pair of peaks of each trough, and wherein for each row of the plurality of rows of openings, only the openings of one row of the plurality of rows of openings is located in between the pair of peaks that the particular row of openings is located above;
f) wherein each of the plurality of openings of each row has a largest dimension, and this largest dimension is smaller than the lateral distance between the pair of peaks that the particular row of openings is located above, but sufficiently large so that an elongated pepper food item extending through one of the plurality of openings of the particular row is supported by both the opening the pepper food item extends through and the trough the particular row of openings is above; and
g) wherein the lower sheet is of a mesh material.

16. The food grilling rack of claim 15, wherein the elongated pepper food item is substantially vertical.

17. The food grilling rack of claim 15, wherein the upper and lower sheets are spaced apart with a gap therebetween.

18. The food grilling rack of claim 15, wherein the connected side walls of the pan form right angled corners.

19. The food grilling rack of claim 15, wherein there are at least three (3) of said troughs.

\* \* \* \* \*